United States Patent
Kida et al.

(10) Patent No.: US 11,465,420 B2
(45) Date of Patent: Oct. 11, 2022

(54) INK JET INK SET AND PRINTING METHOD

(71) Applicant: Seiko Epson Corporation, Tokyo (JP)

(72) Inventors: Hiroaki Kida, Shiojiri (JP); Hiroshi Takiguchi, Matsumoto (JP); Kenichiro Kubota, Matsumoto (JP); Akira Matsumoto, Shiojiri (JP)

(73) Assignee: SEIKO EPSON CORPORATION

( * ) Notice: Subject to any disclaimer, the term of this patent is extended or adjusted under 35 U.S.C. 154(b) by 100 days.

(21) Appl. No.: 17/035,949

(22) Filed: Sep. 29, 2020

(65) Prior Publication Data

US 2021/0094313 A1   Apr. 1, 2021

(30) Foreign Application Priority Data

Sep. 30, 2019   (JP) .............. JP2019-180773

(51) Int. Cl.
*B41J 2/21* (2006.01)
*B41J 2/14* (2006.01)

(52) U.S. Cl.
CPC .......... *B41J 2/2114* (2013.01); *B41J 2/14201* (2013.01); *B41J 2/211* (2013.01)

(58) Field of Classification Search
CPC ......... C09D 11/37; C09D 11/40; C09D 11/52; B41J 2/2114
See application file for complete search history.

(56) References Cited

U.S. PATENT DOCUMENTS

| 2015/0197654 | A1* | 7/2015 | Okuda | C09D 11/54 |
| | | | | 524/88 |
| 2015/0315397 | A1* | 11/2015 | Toyoda | B41J 2/04586 |
| | | | | 347/100 |

FOREIGN PATENT DOCUMENTS

JP   2015-212018 A   11/2015

* cited by examiner

*Primary Examiner* — Scott A Richmond
(74) *Attorney, Agent, or Firm* — Harness, Dickey & Pierce, P.L.C.

(57) ABSTRACT

An ink jet ink set includes a plurality of inks to be ejected by an ink jet method. The ink set includes a first ink containing metal particles, and a second ink containing a coloring agent selected from materials other than metal. The surface tension of the first ink is lower than that of the second ink.

10 Claims, No Drawings

INK JET INK SET AND PRINTING METHOD

The present application is based on, and claims priority from JP Application Serial Number 2019-180773, filed Sep. 30, 2019, the disclosure of which is hereby incorporated by reference herein in its entirety.

BACKGROUND

1. Technical Field

The present disclosure relates to an ink jet ink set and a printing method.

2. Related Art

Metal plating, foil stamping using a metal foil, thermal transfer using a metal foil, and the like have been used for producing glossy decorative items.

These techniques are, however, not much suitable for forming fine patterns or being used for curved or bent portions.

In some printing processes, compositions containing a pigment or a dye are applied onto a printing medium by an ink jet method. Printing by an ink jet method is superior in favorably forming precise patterns and applying to curved or bent portions.

For example, JP-A-2015-212018 discloses a concept to produce a printed item including a colored layer having a metallic luster, or printed layer having a metallic color, by using an ink containing metal particles and a color ink containing non-metal pigment or dye in combination.

However, the printed layer formed by the combined use of the ink containing metal particles and the color ink is not sufficiently glossy.

SUMMARY

Such an issue is solved by the concept of the present disclosure implemented as the following embodiments.

According to an aspect of the present disclosure, an ink jet ink set is provided, and which includes a plurality of inks to be ejected by an ink jet method. The ink set includes a first ink containing metal particles, and a second ink containing a coloring agent selected from materials other than metal. The surface tension of the first ink is lower than that of the second ink.

In an embodiment of the ink jet ink set, the first ink may contain a surface treatment agent that modifies the surfaces of the metal particles. The surface treatment agent is at least one selected from the group consisting of phosphorus compounds and poly(oxyalkylene)amines.

In an embodiment of the ink jet ink set, the difference in surface tension of the second ink from the first ink may be 0.5 mN/m or more.

In an embodiment of the ink jet ink set, both of the first and second inks may be nonaqueous ink.

In an embodiment of the ink jet ink set, the first ink may contain a first surfactant, and the second ink contains a second surfactant different from the first surfactant. A first surfactant solution that is a 0.1 mass % solution of the first surfactant in diethylene glycol diethyl ether has a lower surface tension than a second surfactant solution that is a 0.1 mass % solution of the second surfactant in diethylene glycol diethyl ether.

In an embodiment of the ink jet ink set, the metal particles may individually have a shape like a fish scale.

According to another aspect of the present disclosure, a printing method is provided, and which includes a first application step of ejecting a first ink containing metal particles by an ink jet method to apply the first ink onto a printing medium, and a second application step of ejecting a second ink containing a coloring agent selected from materials other than metal by an ink jet method to apply the second ink onto the printing medium having the first ink applied thereto. The second ink has a higher surface tension than the first ink.

In an embodiment of the printing method, the first ink may contain a surface treatment agent that modifies the surfaces of the metal particles. The surface treatment agent is at least one selected from the group consisting of phosphorus compounds and poly(oxyalkylene)amines.

In an embodiment of the printing method, the difference in surface tension of the second ink from the first ink may be 0.5 mN/m or more.

In an embodiment of the printing method, both of the first and second inks may be nonaqueous ink.

In an embodiment of the printing method, the first ink may contain a first surfactant, and the second ink contains a second surfactant different from the first surfactant. A first surfactant solution that is a 0.1 mass % solution of the first surfactant in diethylene glycol diethyl ether has a lower surface tension than a second surfactant solution that is a 0.1 mass % solution of the second surfactant in diethylene glycol diethyl ether.

In an embodiment of the printing method, the metal particles individually have a shape like a fish scale.

DESCRIPTION OF EXEMPLARY EMBODIMENTS

Exemplary embodiments of the present disclosure will now be described in detail.

1. Printing Method

The printing method of the present disclosure will first be described.

The printing method of the present disclosure, which is a method for producing a printed item, includes a first application step of ejecting a first ink containing metal particles by an ink jet method to apply the first ink onto a printing medium, and a second application step of ejecting a second ink containing a coloring agent by an ink jet method to apply the second ink onto the printing medium having the first ink applied thereto. The coloring agent is selected from materials other than metal (and is hereinafter referred to as a non-metal coloring agent). In this method, the surface tension of the first ink is lower than that of the second ink. In other words, the printing method of the present disclosure uses an ink jet ink set including a first ink containing metal particles, and a second ink containing a non-metal coloring agent and having a higher surface tension than the first ink.

This printing method enables favorable production of printed items including a glossy metallic color printed layer. Probably, the reason for this is as described below.

For ejecting inks having different compositions containing respective coloring agents one on top of another by an ink jet method, the surface tension of the ink of the upper layer may often be controlled to lower than that of the ink of the lower layer. For example, when inks are applied so that the ink forming the upper layer has a lower surface tension than the ink forming the lower layer, the upper ink spreads favorably over the lower ink, thus preventing the printed image from having thinned lines or other defects caused by the failure of the upper ink to spread sufficiently.

Meanwhile, for forming a metallic color printed layer by a combined use of a first ink containing metal particles and a second ink containing a non-metal coloring agent, the second ink is applied onto the first ink previously applied to a printing medium.

The present inventors found that if the first ink has a lower surface tension than the second ink in the combined use as just described, the metal particles in the first ink are disordered when the second ink has been applied onto the first ink, resulting in a seriously reduced gloss. The present inventors then found that this problem, that is, a decrease in gloss caused by disordered metal particles in the first ink, can be prevented effectively by controlling the surface tension of the first ink containing metal particles to lower than the surface tension of the second ink containing a non-metal coloring agent. When the second ink, containing a non-metal coloring agent, to be applied to the first ink containing metal particles has a higher surface tension than the first ink, the second ink does not excessively permeate the first ink coating or spread out. Thus, the metallic luster of the first ink can be prevented from decreasing, and undesired color unevenness or the like can be prevented effectively.

However, when the surface tensions of the first and second inks do not have such a relationship, the inks do not produce the above-described advantageous effects.

For example, if the surface tension of the first ink is higher than or equal to that of the second ink, the metallic color printed layer of the resulting printed item is not sufficient in gloss.

The surface tensions of the first and second inks are the measurements obtained under the same conditions and are, more specifically, static surface tensions measured at 20° C. in accordance with the Wilhelmy plate method (vertical plate method). For example, the surface tensions can be measured with a surface tensiometer of DY series manufactured by Kyowa Interface Science.

When the surface tensions at 20° C. of the first and second inks satisfy the above-described specific relationship, the first and second inks respectively applied in the first and second application steps of the printing method of the present disclosure exhibit surface tensions having the same specific relationship, reliably producing the above-described advantageous effects.

In the following description, the first and second inks may be collectively referred to merely as the inks.

The surface tensions of the first and second inks can be appropriately controlled by varying the constituents and their proportions. In particular, by selecting the surfactant described later herein and the content thereof, the surface tensions of the first and second inks can be appropriately controlled.

The surface tension of the first ink is lower than that of the second ink, as described above. In some embodiments, the lower limit of the difference in surface tension between the second ink and the first ink may be 0.5 mN/m or more, for example, 1.0 mN/m or 2.0 mN/m. Also, the upper limit of the difference between the surface tensions of the second and first inks may be 15 mN/m or less, for example, 10 mN/m, and is beneficially 5 mN/m.

Such control of the surface tensions broadens the choices of the compositions of the first and second inks helps the inks to produce the above-described effects.

The steps of the printing method of the present disclosure will now be described. The ink jet ink set including the first ink and the second ink will be described after the description of the steps of the printing method.

1-1. First Application Step

In the first application step, the first ink containing metal particles is ejected by an ink jet method to apply the ink onto a printing medium.

The printing medium may be absorbent or not absorbent, and any type may be used. For example, the printing medium may be made of paper, such as plain paper or ink jet-dedicated paper, plastics, metal, ceramics, wood, or shell or may be a cloth or a nonwoven fabric of natural or synthetic fiber, such as cotton, polyester, or wool. The printing medium may be a sheet or in any form without particular limitation.

The ink jet method may be conducted to eject inks by using piezoelectricity or using bubbles formed by heating the inks. Piezoelectricity is not likely to alter the quality of the inks and is therefore beneficial.

For a piezoelectric ink jet method, the conditions for ejecting the first ink, such as the waveform and frequency of the piezoelectric elements and the size of ink droplets, may be set as desired without particular limitation.

The temperature in the atmosphere in which the first ink is ejected may be, but is not limited to, 5° C. or more. In an embodiment, the lower limit thereof may be 10° C., beneficially 15° C. Also, the upper limit of the temperature in the atmosphere in which the first ink is ejected may be, but is not limited to, 50° C. or less, for example, 40° C., and is beneficially 35° C.

Such an atmosphere enables consistent ejection of the first ink and helps the surface tensions to satisfy the above-described relationship under the conditions of the printing method for producing printed items.

The temperature of the printing medium to which the first ink is ejected may be, but is not limited to, 5° C. or more. In an embodiment, the lower limit thereof may be 10° C., beneficially 15° C. Also, the upper limit of the temperature of the printing medium to which the first ink is ejected may be, but is not limited to, 70° C. or less, for example, 65° C., and is beneficially 60° C.

Such a temperature of the printing medium helps the first ink to favorably wet the printing medium to spread out while allowing the surface tensions to satisfy the above-described relationship under the conditions of the printing method for producing printed items.

For ejecting the first ink by an ink jet method, a known liquid ejection apparatus may be used.

In the first application step, at least one first ink is used, and a plurality of first inks may be ejected.

1-2. Second Application Step

In the second application step, the second ink containing a non-metal coloring agent is ejected by an ink jet method to apply the second ink onto the printing medium having the first ink previously applied thereto.

In the second application step, the second ink is ejected such that at least a portion thereof overlies the first ink on the printing medium.

As a result, the second ink overlaps the first ink and is seen on the front side with respect to the first ink having a metallic luster when viewed from the ink application side. Thus, an image having a metallic luster colored with the second ink, for example, a colored metallic image, can be seen.

For a piezoelectric ink jet method, the conditions for ejecting the second ink, such as the waveform and frequency of piezoelectric elements and the size of ink droplets, may be set as desired without particular limitation.

The temperature in the atmosphere in which the second ink is ejected may be, but is not limited to, 5° C. or more.

In an embodiment, the lower limit thereof may be 10° C., beneficially 15° C. Also, the upper limit of the temperature in the atmosphere in which the second ink is ejected may be, but is not limited to, 50° C. or less, for example, 40° C., and is beneficially 35° C.

Such an atmosphere enables consistent ejection of the second ink and helps the surface tensions to satisfy the above-described relationship under the conditions of the printing method for producing printed items.

The difference between the temperature $T_{A1}$ (° C.) of the atmosphere in which the first ink is ejected in the first application step and the temperature $T_{A2}$ (° C.) of the atmosphere in which the second ink is ejected in the second application step, that is, the absolute value of $T_{A1}-T_{A2}$, may be 20° C. or less, for example, 15° C. or less, 10° C. or less, or 5° C. or less. In some embodiments, the temperature difference may be 3° C. or less.

Such temperature control helps form a glossy printed layer with the ink jet ink set.

The temperature of the printing medium to which the second ink is ejected may be, but is not limited to, 5° C. or more. In an embodiment, the lower limit thereof may be 10° C., beneficially 15° C. Also, the upper limit of the temperature of the printing medium to which the second ink is ejected may be, but is not limited to, 70° C. or less, for example, 65° C., and is beneficially 60° C.

Such a temperature of the printing medium helps the second ink to favorably wet the printing medium having the first ink previously applied thereto to spread out while allowing the surface tensions to satisfy the above-described relationship under the conditions of the printing method for producing printed items.

The difference between the temperature $T_{M1}$ (° C.) of the printing medium to which the first ink is ejected in the first application step and the temperature $T_{M2}$ (° C.) of the printing medium to which the second ink is ejected in the second application step, that is, the absolute value of $T_{M1}-T_{M2}$, may be 20° C. or less, for example, 15° C. or less or 10° C. or less.

Such temperature control helps form a glossy printed layer with the ink jet ink set.

For ejecting the second ink by an ink jet method, a known liquid ejection apparatus may be used. In some embodiments, the same liquid ejection apparatus as used for the first ink may be used.

Thus, the productivity of the printed item is increased. In addition, the use of the same apparatus facilitates the alignment of the pattern of the second ink with the pattern of the first ink.

In the second application step, at least one second ink can be used. A plurality of second inks may be ejected.

The printing method of the present disclosure may include further steps in addition to the first and second application steps. For example, the printing method may include a pretreatment step of pretreating the printing medium before the first application step. Also, the printing method may include an intermediate treatment step of removing the solvent from the first ink applied in the first application step and/or an aftertreatment step of removing the liquid medium from the second ink applied in the second application step.

In the printing method of the present disclosure, the inks may be applied to only a specific area of the printing medium in the order of the first application step and then the second application step. For example, the first ink and the second ink may be simultaneously applied to another area of the printing medium. In an embodiment, after the first and second application steps are performed in an area of the printing medium in this order, the first application step may be further performed in that area.

2. Ink Jet Ink Set

The ink jet ink set of the present disclosure will now be described.

The ink jet ink set of the present disclosure includes a first ink containing metal particles, and a second ink containing a non-metal coloring agent and having a higher surface tension than the first ink. The ink jet ink set is used in the ink jet printing method as described above.

In other words, the ink jet ink set includes a plurality of inks to be ejected by an ink jet method. The ink set includes a first ink containing metal particles, and a second ink containing a non-metal coloring agent. The surface tension of the first ink is lower than that of the second ink.

The ink jet ink set can produce a printed item including glossy metallic color printed layer.

2-1. First Ink

The first ink contains metal particles. The surface tension of the first ink is lower than that of the second ink.

The lower limit of the surface tension of the first ink may be, but is not limited to, 15 mN/m or more, for example, 18 mN/m or 19 mN/m. Also, the upper limit of the surface tension of the first ink may be, but is not limited to, 28 mN/m or less, for example, 26 mN/m, and is beneficially 24 mN/m.

The first ink having such a surface tension can be consistently ejected by an ink jet method and favorably wet the printing medium to spread out. Also, such a surface tension leads to the above-described relationship in surface tension with the second ink.

2-1-1. Metal Particles

The first ink contains metal particles. The metal particles may be the same as or vary from each other in size, shape, and/or material.

Individual ones of the metal particles, at least part of the visible portions of the particles, are made of a metal. In a typical embodiment, the outer surfaces and vicinity of the particles are made of a metal.

The metal particles have a great influence on the appearance, particularly gloss, of the printed item produced with the ink jet ink set.

The metal particles, at least a region including the portion around the surface of the individual ones of the particles, are made of a metal. For example, the entirety of the individual particles may be made of a metal, or the metal particle may include a base portion made of a non-metal material and a metal portion covering the base portion. Alternatively, the surfaces of the metal particles may be covered with a passive coating, such as an oxide layer.

The metal forming the metal particles can be selected from among elemental metals and alloys. Examples of such metals include aluminum, silver, gold, platinum, nickel, chromium, tin, zinc, indium, titanium, iron, and copper. In some embodiments, the metal particles are aluminum or aluminum alloy particles. Since aluminum and aluminum alloys have lower specific gravity than iron or the like, the sedimentation of the aluminum or aluminum alloy particles dispersed in the first ink proceeds very slowly. Accordingly, the first ink can be preserved over a long period, and non-uniformity in color density is prevented effectively.

In addition, the use of aluminum or aluminum alloy particles imparts a gloss and a quality appearance to the printed item while suppressing the increase in production cost of the printed item.

The metal particles may be spherical or similar to spindles or needles and may have any shape. In some embodiments, the shape of individual ones of the metal particles is like a fish scale.

Fish scale-like particles are likely to align in such a manner that the main surfaces form a plane along the surface of the printing medium when the first ink is applied onto the printing medium. Thus, the resulting printed item exhibits a gloss or the like that the metal of the particles has by nature, having a printed portion with a gloss and quality appearance. The rub resistance of the printed item is also increased.

The phrase "shape like a fish scale" or "fish scale-like shape" used herein is a shape like a flat or curved plate and whose area viewed at a specific angle, for example, viewed from above, is larger than the area viewed perpendicular to the specific angle. Beneficially, the ratio ($S_1/S_0$) of the area $S_1$ μm² when the shape is viewed in a direction in which the projected area is largest, that is, when viewed from above, to the area $S_0$ μm² that is the largest of the areas viewed perpendicular to that direction is 2 or more, for example, 5 or more or 8 or more. The ratio $S_1/S_0$ may be the average obtained by observing, for example, 50 randomly selected particles. For example, an electron microscope, an atomic force microscope, or the like may be used for the observation.

The average thickness of the fish scale-like metal particles may be, but is not limited to, 5 nm or more, and, for example, the lower limit thereof may be 15 nm. The upper limit of the average thickness of the fish scale-like metal particles may be, but is not limited to, 90 nm or less, for example, 70 nm. In some embodiments, the fish scale-like metal particles have an average thickness of 50 nm or less or 30 nm or less.

Such dimensions allow the fish scale-like metal particles to produce marked effects.

For the volume average particle size of the metal particles, the lower limit may be, but is not limited to, 0.20 μm or more, for example, 0.25 μm or 0.30 μm. The upper limit of the volume average particle size of the metal particles may be, but is not limited to, 1.00 μm or less, for example, 0.90 μm or 0.80 μm.

Such metal particles allow the first ink to have high storage stability and ejection consistency and prevent the resulting printed items effectively from having undesired color unevenness.

The term volume average particle size mentioned herein refers to the median size in a volume size distribution of the particles dispersed in a liquid measured by laser diffraction/scattering, representing that 50% of the particles in the cumulative volume size distribution of a large number of particles are finer than the median size. When fish scale-like metal particles are used, the volume average particle size is based on the shape and size of the particles in plan view.

For the $D_{90}$ in the cumulative volume size distribution of metal particles contained in the first ink, at which 90% of the distribution has a smaller particle size, the lower limit thereof may be 0.40 μm or more, for example, 0.45 μm or 0.50 μm. In some embodiments, the $D_{90}$ may be 0.55 μm or more or 0.60 μm or more.

Also, the upper limit of the $D_{90}$ of the metal particles, at which 90% of the distribution has a smaller particle size, may be 1.75 μm or less, for example, 1.60 μm or 1.50 μm.

Such metal particles allow the first ink to have high storage stability and ejection consistency and prevent the resulting printed items effectively from having undesired color unevenness.

The metal particle content in the first ink may be, but is not limited to, by mass, 0.1% or more, and, for example, the lower limit thereof may be 0.2% or 0.3%. Also, the upper limit of the metal particle content in the first ink may be, but is not limited to, by mass, 5.0% or less, for example, 4.0% or 3.0%.

Such a first ink can be consistently ejected by an ink jet method and much increase the gloss of the portion printed therewith.

The metal particles may be formed by any process. For forming aluminum particles, an aluminum film made by gas-phase deposition may be pulverized. Aluminum particles thus formed can impart the natural luster or gloss of the aluminum more effectively to the portion printed with the ink jet ink set of the present disclosure. Also, variations in property among the particles can be reduced. By pulverizing a metal film, relatively thin metal particles can be favorably formed.

For example, an aluminum film is formed on a substrate and is then pulverized into particles. In this instance, a polyethylene terephthalate film or any other plastic film may be used as the substrate. The substrate may have a release agent layer at the surface on which a metal film is to be formed.

For pulverizing the metal film, ultrasonic vibration may be applied to the metal film in a liquid. Thus, metal particles having the above-described particle size can be reliably produced with small variations in size, shape, and other properties.

The liquid in which the metal is pulverized may be selected from the group consisting of alcohols, such as methanol, ethanol, propanol, and butanol; hydrocarbons, such as n-heptane, n-octane, decane, dodecane, tetradecane, toluene, xylene, cymene, durene, indene, dipentene, tetrahydronaphthalene, decahydronaphthalene, and cyclohexylbenzene; ethers, such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxyethane, bis(2-methoxyethyl) ether, p-dioxane, and tetrahydrofuran; and polar compounds, such as propylene carbonate, γ-butyrolactone, N-methyl-2-pyrrolidone, N,N-dimethylformamide, N,N-dimethylacetamide, dimethyl sulfoxide, cyclohexanone, and acetonitrile. The use of such a liquid prevents the metal particle from oxidizing, increases the productivity of the metal particles, and reduces variations in size, shape, and other properties among the particles.

2-1-2. Surface Treatment Agent

The first ink may contain a surface treatment agent to modify the surfaces of the metal particles.

The first ink containing such a surface treatment agent keeps the dispersion of the metal particles stable and has high storage stability and ejection consistency.

The surface treatment agent may be selected from among, for example, short-chain compounds having a carbon number of 2 to 4 with a substituted or unsubstituted alkyl group, long-chain compounds having a carbon number of 8 to 20 with a substituted or unsubstituted alkyl group, silane compounds, phosphorus compounds, carboxylic acids, and isocyanates. Examples of phosphorus compounds, which are compounds containing phosphorus, include phosphoric acid derivatives, phosphonic acid derivatives, and phosphinic acid derivatives. Such derivatives include tautomers, esterified compounds, etherified compounds, compounds of which the molecular structure has one or more organic groups substituted for the corresponding number of hydrogen atoms. Phosphorous compounds used as a surfactant may be used as the surface treatment agent.

If the alkyl group of the short-chain or long-chain compounds is substituted, the substituent may be a halogen, such as fluoro, chloro, or bromo, or hydroxy.

Exemplary silane compounds may contain a silane atom to which hydrogen atoms and/or hydrocarbon groups are directly bound. In this instance, the hydrocarbon groups may have atoms or atomic groups other than hydrogen that are substituted for some or all of the hydrogen atoms.

The phosphorus compounds may include compounds having at least one alkyl group having a carbon number of 6 or more in the molecule, that is, long-chain alkyl phosphorus compounds.

An example of the carboxylic acids may be a compound containing a hydrocarbon group and a carboxy group, that is, a fatty acid. Examples of the fatty acid include decanoic acid, tetradecanoic acid, octadecanoic acid, and cis-9-octadecenoic acid.

Isocyanates are compounds having the —N=C=O partial structure.

A fluorine-containing compound may be used as the surface treatment agent. The fluorine-containing compound can be selected from compounds having at least one fluorine atom in the molecule. For example, the fluorine-containing compound may be a compound formed by substituting at least one fluorine atom for the hydrogen atoms of any of the above-described short-chain compounds, long-chain compounds, silane compounds, phosphorus compounds, carboxylic acids, and isocyanates.

In an embodiment, the surface treatment agent may be a compound with an alkyl group having a carbon number of 3 or more or a fluoroalkyl group having at least one fluorine atom substituted for the corresponding number of hydrogen atoms of the alkyl group. The lower limit of the carbon number of the alkyl group may be 5 or more, for example, 8. Also, the upper limit of the carbon number of the alkyl group may be 30 or more, for example, 20, and is beneficially 15.

If the phosphorus compound has a substituent, the substituent may be substituted for the hydrogen atom bound to the phosphorus atom of the phosphorus compound or for the hydrogen atom of the hydroxy group bound to the phosphorus atom.

In some embodiments, the first ink may contain at least one surface treatment agent selected from the group consisting of phosphorus compounds and poly(oxyalkylene) amines.

Such a first ink keeps the dispersion of the metal particles stable and has high ejection consistency. Also, the use of such a surface treatment agent facilitated the first ink having an appropriate surface tension.

In particular, the first ink containing both a phosphorus compound and a poly(oxyalkylene)amine keeps the dispersion of the metal particles more stable, especially when the first ink is stored over a long period or under severe conditions, and has still higher ejection consistency. Also, such a first ink has an appropriate surface tension as described above.

The phosphorus compound may have a structure having a substituent for a portion of phosphoric acid or phosphonic acid. For example, a phosphorus compound to which, for example, a fluorine atom or an alkyl group having a carbon number of 3 or more is introduced may be used as the surface treatment agent.

In some embodiments, the phosphorus compound may be a fluoro-phosphorus compound that is a phosphorus compound having at least one fluorine atom in the molecule.

Such a fluoro-phosphorus compound can keep the dispersion of the metal particles in the first ink more stable. In addition, by using a phosphorus compound and a poly (oxyalkylene)amine in combination, the above-described effects can be synergistically produced. More specifically, the storage stability and the ejection consistency of the first ink can be increased, and the gloss of the items printed with the ink jet ink set can be further increased.

In an embodiment, a fluoro-phosphorus compound having a perfluoroalkyl structure may be used as the phosphorus compound.

Such a fluoro-phosphorus compound can further increase the storage stability of the first ink and the gloss and the rub resistance of the items printed with the ink jet ink set.

The first ink may contain a plurality of phosphorus compound as the surface treatment agent. In this instance, the surfaces of the individual metal particles may be treated with the plurality of phosphorus compounds. Alternatively, the metal particles may be surface-treated with different phosphorus compounds among the particles.

For the surface treatment with a phosphorus compound, the phosphorus compound may be added to the liquid in which the metal film to be pulverized into the metal particles is formed by the above-described gas-phase deposition.

If individual ones of the particles are surface-treated with a plurality of phosphorus compounds, the surface treatment may be performed in different steps or a common step.

The phosphorus compound content in the first ink may be, but is not limited to, by mass, 0.01% or more. For example, the lower limit of the phosphorus compound content may be 0.02%, beneficially 0.04%. Also, the upper limit of the phosphorus compound content in the first ink may be, but is not limited to, by mass, 3.0% or less, for example, 2.0% or 1.5%.

Such a first ink can be consistently ejected by an ink jet method and increase the gloss of the portion printed with the ink jet ink set.

In the first ink, the ratio XP/XM of the phosphorus compound content XP (mass %) to the metal particle content XM (mass %) may be, but is not limited to, 0.01 or more. For example, the lower limit of XP/XM may be 0.02 or 0.03. Also, the ratio XP/XM may be, but is not limited to, 1 or less. For example, the upper limit of XP/XM may be 0.9 or 0.8.

Such a first ink can be consistently ejected by an ink jet method and increase the gloss of the portion printed with the ink jet ink set.

For the poly(oxyalkylene)amine, any compound may be used provided that the molecule thereof has a polyoxyalkylene structure. In some embodiments, the poly(oxyalkylene)amine is at least one selected from the group consisting of the compounds represented by formula (1) and salts thereof and the compounds represented by formula (2) and salts thereof:

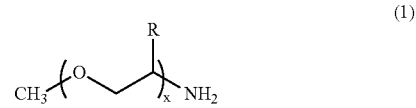

(1)

wherein R represents a hydrogen atom or an alkyl group having a carbon number of 3 or less, and x represents a number of 10 or more, and wherein the polyoxyalkylene structure of formula (1) may include a plurality of oxyalkylene units having varying R's.

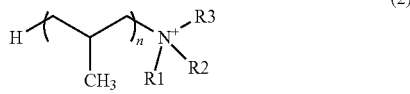
(2)

wherein R1, R2, and R3 each independently represent an alkyl group having a carbon number of 3 or less, and n represents a number of 10 or more.

These poly(oxyalkylene)amines can increase the storage stability of the first ink, and the first ink thus can be consistently ejected and form glossier printed items even after storage over a long period or under severe conditions.

R in formula (1), which is an hydrogen atom or an alkyl having a carbon number of 3 or less, may be hydrogen or methyl, and, in some embodiments, the poly(oxyalkylene) amine may be a compound represented by the following formula (3):

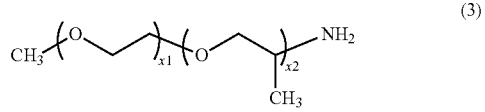
(3)

wherein X1 and X2 each independently represent an integer of 1 or more, and X1+X2 is 10 or more. In formula (3), the order of the oxyethylene units and the oxypropylene units may be arbitrary.

Such poly(oxyalkylene)amines can further increase the storage stability of the first ink, and the first ink thus can be consistently ejected and form still glossier printed items even after storage over a long period or under severe conditions.

In the molecule of the poly(oxyalkylene)amine represented by formula (3), the lower limit of the X1/X2 value, that is, the ratio of the number of oxyethylene units X1 to the number of oxypropylene units X2, may be 0.05 or more, for example, 0.15, and is beneficially 0.70. Also, the upper limit of X1/X2 may be 10.00 or less, for example, 8.00 or 6.00.

Such poly(oxyalkylene)amines can further increase the storage stability of the first ink, and the first ink thus can be consistently ejected and form still glossier printed items even after storage over a long period or under severe conditions.

Also, the order of the oxyethylene units and the oxypropylene units in formula (3) may be arbitrary, as described above. More specifically, in formula (3), an amino group is bound to an end of the continuous chain of oxyethylene units, while a methyl group is bound to an end of the continuous chain of oxypropylene units. In an embodiment, however, an amino group may be bound to an end of the continuous chain of oxypropylene units, while a methyl group is bound to an end of the continuous chain of oxyethylene units. The compound represented by formula (3) may be a block copolymer or a random copolymer.

In formula (2), R1, R2, and R3 are each independently an alkyl group having a carbon number of 3 or less and may be, for example, methyl or ethyl. In some embodiments, one of the three alkyl groups R1, R2, R3 is methyl, and the other two are ethyl.

Such a compound can further increase the storage stability of the first ink, and the first ink thus can be consistently ejected and form still glossier printed items even after storage over a long period or under severe conditions.

The following formula (4) represents a compound of formula (2) having a methyl group as one of R1, R2, and R3 and ethyl groups as the other two.

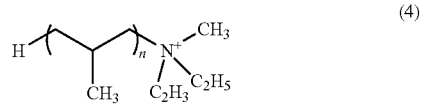
(4)

wherein n represents an integer of 10 or more.

The compounds represented by formula (2) or (4) contain an anion counter to the cation. Examples of the anion include halide ions, such as chloride and bromide, a hydroxide ion, a sulfate ion, a nitrate ion, and a phosphate ion.

The weight average molecular weight of the poly(oxyalkylene)amine may be, but is not limited to, 300 or more or 500 or more, and the lower limit thereof may be, for example, 800, beneficially 1000. Also, the upper limit of the weight average molecular weight of the poly(oxyalkylene) amine may be, but is not limited to, 8000 or less, for example, 5000, and is beneficially 3000.

Such poly(oxyalkylene)amines can further increase the storage stability of the first ink, and the first ink thus can be consistently ejected and form still glossier printed items even after storage over a long period or under severe conditions.

The first ink may contain a plurality of poly(oxyalkylene) amines. In this instance, the surfaces of the individual metal particles may be treated with the plurality of poly(oxyalkylene)amines. Alternatively, the metal particles may be surface-treated with different poly(oxyalkylene)amines among the particles.

For the surface treatment of the metal particles with a poly(oxyalkylene)amine, the poly(oxyalkylene)amine may be added to the liquid in which the metal film to be pulverized into the metal particles is formed by the above-described gas-phase deposition.

When individual ones of the particles are surface-treated with a plurality of poly(oxyalkylene)amines, the surface treatment may be performed in different steps or a common step.

In an embodiment in which the first ink contains both a phosphorus compound and a poly(oxyalkylene)amine, the surface treatment with the poly(oxyalkylene)amine may be performed simultaneously with the treatment with the phosphorus compound or in a different step. The metal particles may be surface-treated with the poly(oxyalkylene)amine before or after the surface treatment with the phosphorus compound.

The poly(oxyalkylene)amine content in the first ink may be, but is not limited to, by mass, 0.01% or more, and, for example, the lower limit thereof may be 0.06%, beneficially 0.10%. Also, the upper limit of poly(oxyalkylene)amine content in the first ink may be, but is not limited to, by mass, 1.0% or less, for example, 0.70%, and is beneficially 0.50%.

Such a first ink can be consistently ejected by an ink jet method and increase the gloss of the portion printed with the ink jet ink set.

In the first ink, the ratio XA/XP of the poly(oxyalkylene) amine content XA (mass %) to the phosphorus compound content XP (mass %) may be, but is not limited to, 0.10 or more. For example, the lower limit of XA/XP may be 0.40, beneficially 2.0. Also, the upper limit of XA/XP may be 10.0 or less, for example, 8.0, beneficially 6.0.

The first ink containing poly(oxyalkylene)amines and phosphorous compound in such a proportion has more satisfactory storage stability of the first ink and can be consistently ejected and form still glossier printed items even after storage over a long period or under severe conditions.

2-1-3. Dispersion Medium

The first ink contains a dispersion medium in which the metal particles are dispersed. The dispersion medium enables the first ink to be ejected by an ink jet method.

In an embodiment, the first ink may contain water as a dispersion medium. In some embodiments, however, the dispersion medium is an organic solvent, which is what is called a nonaqueous solvent. In other words, the first ink may be a nonaqueous ink. The nonaqueous ink contains a nonaqueous solvent as the dispersion medium and does not use water as the dispersion medium. The nonaqueous solvent content in the ink may be, by mass, 30% or more, for example, 40% or more or 50% or more. In some embodiments, an organic solvent is used as the nonaqueous solvent. The water content in the nonaqueous ink is limited to 1% by mass or less and may be, beneficially, 0.5% by mass or less.

Such a nonaqueous ink can permeate the printing medium, and the adhesion thereof to the printing medium increases. However, when the second ink is applied onto the coating of the nonaqueous first ink on a printing medium, a relatively large part of the dispersion medium remains in the first ink. In the known printing process, when the second ink was applied onto the first ink coating in this state, the metal particles were often disordered and resulted in a reduced gloss of the printed item. The ink set of the present disclosure prevents such a problem even though the first ink is nonaqueous. Hence, the ink set of the present disclosure is particularly effective when a nonaqueous ink is used as the first ink.

Examples of the nonaqueous solvent include esters, ethers, hydroxy ketones, carbonate diesters, and cyclic amides. More specifically, the compounds that can be used as the nonaqueous solvent include 2-(2-methoxy-1-methylethoxy)-1-methylethyl acetate, triethylene glycol dimethyl ether, triethylene glycol diacetate, diethylene glycol monoethyl ether acetate, 4-methyl-1,3-dioxolan-2-one, bis(2-butoxyethyl) ether, dimethyl glutarate, ethylene glycol di-n-butyrate, 1,3-butylene glycol diacetate, diethylene glycol monobutyl ether acetate, tetraethylene glycol dimethyl ether, 1,6-diacetoxyhexane, tripropylene glycol monomethyl ether, butoxypropanol, diethylene glycol methyl ethyl ether, diethylene glycol methyl butyl ether, triethylene glycol methyl ethyl ether, triethylene glycol methyl butyl ether, dipropylene glycol monomethyl ether acetate, diethylene glycol dimethyl ether, ethyl 3-ethoxypropionate, diethylene glycol ethyl methyl ether, 3-methoxybutyl acetate, diethylene glycol diethyl ether, ethyl octanoate, ethylene glycol monobutyl ether acetate, ethylene glycol monobutyl ether, cyclohexyl acetate, diethyl succinate, ethylene glycol diacetate, propylene glycol diacetate, 4-hydroxy-4-methyl-2-pentanone, dimethyl succinate, 1-butoxy-2-propanol, diethylene glycol monoethyl ether, diethylene glycol monomethyl ether, dipropylene glycol monomethyl ether, 3-methoxy-n-butyl acetate, diacetin, dipropylene glycol mono-n-propyl ether, polyethylene glycol monomethyl ether, butyl glycolate, ethylene glycol monohexyl ether, dipropylene glycol mono-n-butyl ether, N-methyl-2-pyrrolidone, triethylene glycol butyl methyl ether, bis(2-propoxyethyl) ether, diethylene glycol diacetate, diethylene glycol butyl methyl ether, diethylene glycol butyl ethyl ether, diethylene glycol butyl propyl ether, diethylene glycol ethyl propyl ether, diethylene glycol methyl propyl ether, diethylene glycol propyl ether acetate, triethylene glycol methyl ether acetate, triethylene glycol ethyl ether acetate, triethylene glycol propyl ether acetate, triethylene glycol butyl ether acetate, triethylene glycol butyl ethyl ether, triethylene glycol ethyl methyl ether, triethylene glycol ethyl propyl ether, triethylene glycol methyl propyl ether, dipropylene glycol methyl ether acetate, n-nonyl alcohol, diethylene glycol mono-n-butyl ether, triethylene glycol monomethyl ether, ethylene glycol 2-ethyl hexyl ether, triethylene glycol monoethyl ether, diethylene glycol monohexyl ether, triethylene glycol monobutyl ether, diethylene glycol mono-2-ethylhexyl ether, tripropylene glycol mono-n-butyl ether, butyl Cellosolve acetate, and γ-butyrolactone. The organic solvent may be one or a combination of two or more of these compounds.

In some embodiments, at least either diethylene glycol diethyl ether or diethylene glycol methyl ethyl ether may be used as the nonaqueous solvent.

Such a nonaqueous solvent can further increase the storage stability of the first ink, and the first ink thus can be consistently ejected and form still glossier printed items even after storage over a long period or under severe conditions. Also, the use of such a nonaqueous solvent facilitates the preparation of the first ink having an appropriate surface tension.

In the first ink, the total mass of diethylene glycol diethyl ether and diethylene glycol methyl ethyl ether may account for 20% or more, for example, 30% or more or 40% or more, of the total mass of the nonaqueous solvent. The use of nonaqueous solvents in such a proportion is effective.

The nonaqueous solvent content in the first ink may be, but is not limited to, by mass, 60% or more, and, for example, the lower limit thereof may be 70% and is beneficially 80%. Also, the upper limit of the nonaqueous solvent content in the first ink may be, but is not limited to, by mass, 99.8% or less, for example, 99.5%, and is beneficially 99.0%.

2-1-4. Surfactant

The first ink may contain a surfactant. The use of a surfactant facilitates the control of the surface tension of the first ink.

In the following description, the surfactant contained in the first ink will be referred to as the first surfactant. The first surfactant may be an individual compound or a combination of a plurality of compounds.

The first surfactant may be an acrylic surfactant, an acetylene-based surfactant, a silicone surfactant, or a fluorosurfactant or a combination thereof.

In some embodiments, the first surfactant may include or contain at least either a silicone surfactant or a fluorosurfactant, particularly, a fluorosurfactant. The fluorosurfactant may contain a fluorine-containing oligomer.

The first ink containing such a first surfactant has an appropriate surface tension as described above.

The fluorosurfactant containing a fluorine-containing oligomer is commercially available, and examples thereof include MEGAFAC R-40 (produced by DIC Corporation) and FTERGENT 710FL (produced by Neos).

In some embodiments, fluorosurfactants account for 50% or more, for example, 80% or more or 90% or more, of the total mass of the first surfactant in the first ink. Such a first surfactant can markedly produce the above-described effects.

The first surfactant content in the first ink may be, but is not limited to, by mass, 0.01% or more and, for example, the lower limit thereof may be 0.02%, 0.03%, or 0.05%. In some embodiments, the lower limit of the first surfactant may be 0.1%. Also, the upper limit of the first surfactant content in the first ink may be, but is not limited to, by mass, 0.7% or less, for example, 0.6% or 0.5%.

The first ink containing a first surfactant in such a proportion has an appropriate surface tension and can produce printed items while preventing the first surfactant from affecting the appearance of the printed item.

2-1-5. Other Constituents

The first ink may contain other constituents. Examples of such constituents include a leveling agent, a binder, a polymerization promoter, a polymerization inhibitor, a photopolymerization initiator, a dispersant, a penetration enhancer, a moisturizing agent, a coloring agent, a fixing agent, a fungicide, a preservative, an antioxidant, a chelating agent, a thickener, and a sensitizer. The binder may be a resin, such as urethane resin, acrylic resin, or ester resin.

The first ink, if it is a nonaqueous ink, may contain a small amount of water in addition to the nonaqueous solvent. The water content of such a first ink may be, by mass, 1.0% or less, for example, 0.5% or less, and is beneficially 0.1% or less.

The viscosity of the first ink, measured at 20° C. with a vibration viscometer in accordance with JIS Z 8809, may be, but is not limited to, 25 mPa·s or less, and the upper limit thereof may be 15 mPa·s. Also, the lower limit of the viscosity of the first ink, measured at 20° C. with a vibration viscometer in accordance with JIS Z 8809, may be, but is not limited to, 0.5 mPa·s. The first ink having a viscosity in such a range can be favorably ejected in the form of droplets by an ink jet method. The ink jet set may include a plurality of first inks.

Also, the ink set may include a plurality of second inks, as will be described later herein. If the ink set include a plurality of first inks and a plurality of second inks, the above-described relationship in surface tension is satisfied between any first ink and the second ink applied onto the first ink. In other words, the surface tensions of a first ink and a second ink not to be applied onto the first ink do not necessarily satisfy the relationship.

2-2. Second Ink

The second ink does not contain metal particles, but a coloring agent selected from materials other than metal. The surface tension of the second ink is higher than that of the first ink.

The second ink is ejected such that at least a portion thereof overlies the first ink previously applied to a printing medium.

The lower limit of the surface tension of the second ink may be, but is not limited to, 20 mN/m or more, for example, 22 mN/m, and is beneficially 25 mN/m. Also, the upper limit of the surface tension of the second ink may be, but is not limited to, 35 mN/m or less, for example, 33 mN/m, and is beneficially 31 mN/m.

The second ink having such a surface tension can be consistently ejected by an ink jet method and favorably wet the printing medium having the first ink previously applied thereto to spread out. Also, such a surface tension leads to the above-described relationship in surface tension with the first ink.

2-2-1. Coloring Agent

The second ink contains a non-metal coloring agent. The coloring agent may be in the form of particles. In this instance, the coloring agent particles may be the same as or vary from each other in size, shape, and/or material.

The coloring agent may be a dye or a pigment other than metal pigments.

Examples of the pigment include C. I. Pigment Reds 2, 3, 5, 17, 22, 23, 38, 81, 48:1, 48:2, 48:3, 48:4, 49:1, 52:1, 53:1, 57:1, 63:1, 112, 122, 144, 146, 149, 166, 170, 176, 177, 178, 179, 185, 202, 207, 209, 254, 101, 102, 105, 106, 108, and 108:1; C. I. Pigment Greens 7, 36, 15, 17, 18, 19, 26, and 50; C. I. Pigment Blues 1, 15, 15:1, 15:2, 15:3, 15:4, 15:6, 17:1, 18, 60, 27, 28, 29, 35, 36, and 80; C. I. Pigment Yellows 1, 3, 12, 13, 14, 17, 55, 73, 74, 81, 83, 93, 94, 95, 97, 108, 109, 110, 129, 138, 139, 150, 151, 153, 154, 168, 184, 185, 34, 35, 35:1, 37, 37:1, 42, 43, 53, and 157; C. I. Pigment Violets 1, 3, 19, 23, 50, 14, and 16; C. I. Pigment Oranges 5, 13, 16, 36, 43, 20, 20:1, and 104; and C. I. Pigment Browns 25, 7, 11, and 33. The pigment may be an individual one or a combination of two or more selected from among these pigments.

The dye may be an azo dye, an anthraquinone dye, a condensed polycyclic aromatic carbonyl dye, an indigoid dye, a carbonium dye, a phthalocyanine dye, or a methine or polymethine dye. More specifically, examples of the dye include C. I. Direct Reds 2, 4, 9, 23, 26, 28, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247; C. I. Acid Reds 35, 42, 51, 52, 57, 62, 80, 82, 111, 114, 118, 119, 127, 128, 131, 143, 145, 151, 154, 157, 158, 211, 249, 254, 257, 261, 263, 266, 289, 299, 301, 305, 319, 336, 337, 361, 396, and 397; C. I. Reactive Reds 3, 13, 17, 19, 21, 22, 23, 24, 29, 35, 37, 40, 41, 43, 45, 49, and 55; C. I. Basic Reds 12, 13, 14, 15, 18, 22, 23, 24, 25, 27, 29, 35, 36, 38, 39, 45, and 46; C. I. Direct Violets 7, 9, 47, 48, 51, 66, 90, 93, 94, 95, 98, 100, and 101; C. I. Acid Violets 5, 9, 11, 34, 43, 47, 48, 51, 75, 90, 103, and 126; C. I. Reactive Violets 1, 3, 4, 5, 6, 7, 8, 9, 16, 17, 22, 23, 24, 26, 27, 33, and 34; C. I. Basic Violets 1, 2, 3, 7, 10, 15, 16, 20, 21, 25, 27, 28, 35, 37, 39, 40, and 48; C. I. Direct Yellows 8, 9, 11, 12, 27, 28, 29, 33, 35, 39, 41, 44, 50, 53, 58, 59, 68, 87, 93, 95, 96, 98, 100, 106, 108, 109, 110, 130, 142, 144, 161, and 163; C. I. Acid Yellows 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227; C. I. Reactive Yellows 2, 3, 13, 14, 15, 17, 18, 23, 24, 25, 26, 27, 29, 35, 37, 41, and 42; C. I. Basic Yellows 1, 2, 4, 11, 13, 14, 15, 19, 21, 23, 24, 25, 28, 29, 32, 36, 39, and 40; C. I. Acid Green 16; C. I. Acid Blues 9, 45, 80, 83, 90, and 185; and C. I. Basic Oranges 21 and 23. The dye may be an individual one or a combination of two or more selected from among these dyes.

The lower limit of the coloring agent content in the second ink may be, but is not limited to, by mass, 0.2% or more, for example, 0.4%, and beneficially 0.7%. Also, the upper limit of the coloring agent content in the second ink may be, but is not limited to, by mass, 7.0% or less, for example, 6.0%, and beneficially 5.0%.

Such a second ink can be consistently ejected by an ink jet method and much enhance the color development of the portion printed therewith.

2-2-2. Liquid Medium

The second ink contains a liquid medium in which the coloring agent is dissolved or dispersed. In other words, the liquid medium of the second ink is a solvent in which the coloring agent is dissolved or a dispersion medium in which the coloring agent is dispersed. The liquid medium enables the second ink to be ejected by an ink jet method.

In an embodiment, the second ink may contain water as the liquid medium. In some embodiments, however, the liquid medium is an organic solvent, which is what is called a nonaqueous solvent. In other words, the second ink may be a nonaqueous ink.

The nonaqueous ink can permeate the printing medium, and the adhesion thereof to the printing medium increases.

In a combined use of a nonaqueous first and second ink, the durability of the printed item in terms of, for example, the adhesion of the inks to the printing medium and the rub resistance of the printed item, can be increased.

Examples of the nonaqueous solvent include esters, ethers, hydroxy ketones, carbonate diesters, and cyclic amides. More specifically, the compounds that can be used as the nonaqueous solvent include 2-(2-methoxy-1-methylethoxy)-1-methylethyl acetate, triethylene glycol dimethyl ether, triethylene glycol diacetate, diethylene glycol monoethyl ether acetate, 4-methyl-1,3-dioxolan-2-one, bis(2-butoxyethyl) ether, dimethyl glutarate, ethylene glycol di-n-butyrate, 1,3-butylene glycol diacetate, diethylene glycol monobutyl ether acetate, tetraethylene glycol dimethyl ether, 1,6-diacetoxyhexane, tripropylene glycol monomethyl ether, butoxypropanol, diethylene glycol methyl ethyl ether, diethylene glycol methyl butyl ether, triethylene glycol methyl ethyl ether, triethylene glycol methyl butyl ether, dipropylene glycol monomethyl ether acetate, diethylene glycol dimethyl ether, ethyl 3-ethoxypropionate, diethylene glycol ethyl methyl ether, 3-methoxybutyl acetate, diethylene glycol diethyl ether, ethyl octanoate, ethylene glycol monobutyl ether acetate, ethylene glycol monobutyl ether, cyclohexyl acetate, diethyl succinate, ethylene glycol diacetate, propylene glycol diacetate, 4-hydroxy-4-methyl-2-pentanone, dimethyl succinate, 1-butoxy-2-propanol, diethylene glycol monoethyl ether, diethylene glycol monomethyl ether, dipropylene glycol monomethyl ether, 3-methoxy-n-butyl acetate, diacetin, dipropylene glycol mono-n-propyl ether, polyethylene glycol monomethyl ether, butyl glycolate, ethylene glycol monohexyl ether, dipropylene glycol mono-n-butyl ether, N-methyl-2-pyrrolidone, triethylene glycol butyl methyl ether, bis(2-propoxyethyl) ether, diethylene glycol diacetate, diethylene glycol butyl methyl ether, diethylene glycol butyl ethyl ether, diethylene glycol butyl propyl ether, diethylene glycol ethyl propyl ether, diethylene glycol methyl propyl ether, diethylene glycol propyl ether acetate, triethylene glycol methyl ether acetate, triethylene glycol ethyl ether acetate, triethylene glycol propyl ether acetate, triethylene glycol butyl ether acetate, triethylene glycol butyl ethyl ether, triethylene glycol ethyl methyl ether, triethylene glycol ethyl propyl ether, triethylene glycol methyl propyl ether, dipropylene glycol methyl ether acetate, n-nonyl alcohol, diethylene glycol mono-n-butyl ether, triethylene glycol monomethyl ether, ethylene glycol 2-ethyl hexyl ether, triethylene glycol monoethyl ether, diethylene glycol monohexyl ether, triethylene glycol monobutyl ether, diethylene glycol mono-2-ethylhexyl ether, tripropylene glycol mono-n-butyl ether, butyl Cellosolve acetate, and γ-butyrolactone. The organic solvent may be one or a combination of two or more of these compounds.

In some embodiments, at least either diethylene glycol diethyl ether or diethylene glycol methyl ethyl ether may be used as the nonaqueous solvent.

The second ink containing such a nonaqueous solvent has an appropriate surface tension as described above. Also, such a second ink can be consistently ejected by an ink jet method.

In the second ink, the total mass of diethylene glycol diethyl ether and diethylene glycol methyl ethyl ether may account for 20% or more, for example, 30% or more or 40% or more, of the total mass of the nonaqueous solvent. The use of nonaqueous solvents in such a proportion is effective.

The nonaqueous solvent content in the second ink may be, but is not limited to, by mass, 60% or more, and, for example, the lower limit thereof may be for example, 70% and is beneficially 80%. Also, the upper limit of the nonaqueous solvent content in the second ink may be, but is not limited to, by mass, 99.8% or less, for example, 99.5%, and is beneficially 99.0%.

(2-2-3) Surfactant

The second ink may contain a surfactant. The use of a surfactant facilitates the control of the surface tension of the second ink.

In the following description, the surfactant contained in the second ink will be referred to as the second surfactant. The second surfactant may be an individual compound or a combination of a plurality of compounds. When a plurality of surfactants is used, the second surfactant is a composition of the plurality of surfactants, and the second surfactant content in the second ink is the proportion of the total mass of the surfactants to the total mass of the second ink.

The second surfactant may be an acrylic surfactant, an acetylene glycol-based surfactant, a silicone surfactant, or a fluorosurfactant or a combination thereof.

In some embodiments, the second surfactant includes or contains a silicone surfactant, particularly, at least either polyester-modified siloxane or polyether-modified siloxane.

The second ink containing such a second surfactant has an appropriate surface tension as described above.

BYK-315N and BYK-325 (both produced by BYK Additives & Instruments) are typical examples of the commercially available polyester-modified or polyether-modified siloxanes.

In some embodiments, silicone surfactants account for 50% or more, for example, 80% or more or 90% or more, of the total mass of the second surfactant in the second ink. Such a second surfactant can markedly produce the above-described effect.

Surfactants may be used according to the following precedence order:

acrylic or acetylene glycol-based surfactants> polyester-modified silicone surfactants> other silicone surfactants> fluorosurfactants. These surfactants are divided into groups by the sign ">", and a group to the left of another is more suitable as the second surfactant, while a group to the right of another is more suitable as the first surfactant. Thus, the surface tensions of the inks can be easily controlled. Surfactants containing fluorine in the molecule are herein defined as fluorosurfactants. Surfactants not containing fluorine but silicon are defined as silicone surfactants. When a plurality of surfactants is used in an ink, the surfactant with the highest content may be selected according to the above precedence order in view of easy control of the surface tension.

In some embodiments, the first ink and the second ink contain a first surfactant and a second surfactant different from the first surfactant, respectively, and the first and second surfactants are as follows. The surface tension of a first surfactant solution that is 0.1 mass % solution of the first surfactant in diethylene glycol diethyl ether is lower than the surface tension of a second surfactant solution that is 0.1 mass % solution of the second surfactant in diethylene glycol diethyl ether. When the solutions of the first and second surfactants satisfy this relationship, the surface tension of the second ink is likely to be higher than that of the first ink.

Thus, the surface tensions of the inks can reliably satisfy the above-described relationship under the conditions of the printing method for producing printed items.

In an embodiment in which the same compounds are used as both the first surfactant and the second surfactant, the first and second surfactants are considered to be different compositions, provided that the proportions of the compounds vary between the surfactants. For example, a first surfactant containing compounds A, B, and C in a ratio of 20:30:50 and a second surfactant containing compounds A, B, and C in a ratio of 30:50:20 are different compositions.

The second surfactant content in the second ink may be, but is not limited to, 0.01% by mass or more. For example, the lower limit of the second surfactant content may be, by mass, 0.02% or 0.03%. Also, the upper limit of the second surfactant content in the second ink may be, but is not limited to, by mass, 0.7% or less, for example, 0.6% or 0.5%.

The second ink containing a second surfactant in such a proportion has an appropriate surface tension and can produce printed items while preventing the second surfactant from affecting the appearance of the printed item.

(2-2-4) Other Constituents

The second ink may contain other constituents. Examples of such constituents include a leveling agent, a binder, a polymerization promoter, a polymerization inhibitor, a photopolymerization initiator, a dispersant, a solubilizing agent, a penetration enhancer, a moisturizing agent, a coloring agent, a fixing agent, a fungicide, a preservative, an antioxidant, a chelating agent, a thickener, and a sensitizer.

The second ink, if it is a nonaqueous ink, may contain a small amount of water in addition to the nonaqueous solvent. The water content of such a second ink may be, by mass, 1.0% or less, for example, 0.5% or less, and is beneficially 0.1% or less.

The viscosity of the second ink, measured at 20° C. with a vibration viscometer in accordance with JIS Z 8809, may be, but is not limited to, 25 mPa·s or less, and the upper limit thereof may be 15 mPa·s. Also, the lower limit of the viscosity of the second ink, measured at 20° C. with a vibration viscometer in accordance with JIS Z 8809, may be, but is not limited to, 0.5 mPa·s. The second ink having a viscosity in such a range can be favorably ejected in the form of droplets by an ink jet method.

The ink jet set may include a plurality of second inks.

The ink set may further include other types of ink in addition to the first and second inks. For example, a clear ink may be used to form a coating covering the printed layer formed of the first and/or second ink.

3. Printed Item

Printed items produced by the printing method of the present disclosure will now be described.

A printed item that is a result of the printing method of the present disclosure is produced by applying the inks of the above-described ink jet ink set by an ink jet method. The printed item includes a glossy metallic color printed layer.

The printed item may be used in any application, for example, for decoration or any other purposes. Examples of the use of the printed item include vehicle interior components, such as console lids, switch bases, center clusters, interior panels, emblems, center consoles, and meter nameplates; control panels of electronic apparatuses; decorative items; and display-intended items, such as indicators and logotypes.

While the concept of the present disclosure has been described with reference to some exemplary embodiments, the implementation of the present disclosure is not limited to the disclosed embodiments.

For example, in an embodiment described above, both the first and second inks are nonaqueous ink. However, at least either the first or the second ink may be an aqueous ink or an energy ray-curable ink, such as a UV-curable ink.

EXAMPLES

Examples of the subject matter of the present disclosure will now be described.

4. Preparation of Ink Jet Ink Set

Example 1

4-1. First Ink

First, a polyethylene terephthalate film having a smooth surface with a surface roughness of 0.02 μm or less was prepared.

Then, a release resin solubilized by acetone was applied over the entirety of one surface of the polyethylene terephthalate film with a roll coater to form a release layer.

The resulting polyethylene terephthalate film having the release layer was transported into a vacuum deposition apparatus at a speed of 5 m/s, and on which aluminum (Al) was deposited to a thickness of a 17.4 nm under reduced pressure.

Subsequently, the polyethylene terephthalate film provided with the Al deposit was immersed in tetrahydrofuran to which ultrasonic vibration of 40 kHz was applied. Thus, the particles of the Al deposit were dispersed to yield a dispersion liquid of metal (Al) powder.

The dispersion liquid was centrifuged to remove the tetrahydrofuran, and diethylene glycol diethyl ether was added to yield a suspension containing 5% by mass of metal (Al) powder.

The suspension was processed in a circulation type high-power ultrasonic pulverizer to pulverize the metal particles to a predetermined size. For this operation, ultrasonic waves of 20 kHz were applied.

Subsequently, poly(oxyalkylene)amines represented by formulas (3) and (4) were added to the resulting suspension. The mixture was heated at 55° C. for 1 hour with application of ultrasonic waves of 40 kHz to brake aggregates of the metal particles, thus dispersing the metal particles as primary particles. The poly(oxyalkylene)amine added as the compound represented by formula (3) was a block copolymer having an amino group bound to an end of the continuous chain of the oxyethylene units and a methyl group bound to an end of the continuous chain of the oxypropylene units, having an X1/X2 value (see formula (3)) in the range of 0.05 to 10.00 and a weight average molecular weight of 2000. The poly(oxyalkylene)amine added as the compound represented by formula (4) had a weight average molecular weight of 5000.

Furthermore, a fluoro-phosphorus compound FHP was added as a phosphorus compound being a surface treatment agent to the dispersion of the metal particles. FHP is represented by $CF_3(CF_2)_5(CH_2)_2-P(O)-(OH)_2$. The resulting mixture was subjected to heat treatment at 55° C. for 3 hours with application of ultrasonic waves of 28 kHz to yield a first ink stock.

The volume average particle size of the metal particles in the first ink stock was 0.49 μm. Also, the $D_{90}$ in the cumulative volume size distribution of the metal particles contained in the first ink stock, at which 90% of the distribution has a smaller particle size, was 0.80 μm.

The first ink stock, diethylene glycol diethyl ether, triethylene glycol monobutyl ether, γ-butyrolactone, a surfactant BYK-333 (produced by BYK Additives & Instruments), and a binder PARALOID B60 (produced by Dow Chemical Company) were mixed in a predetermined proportion. Thus, a first ink having the composition presented in Table 1 was prepared.

4-2. Second Ink

A 15.0 mass % dispersion liquid of C. I. Pigment Blue 15:4 in diethylene glycol diethyl ether, diethylene glycol diethyl ether, diethylene glycol methyl ethyl ether, γ-butyrolactone, PARALOID B60 (produced by Dow Chemical Company), and BYK-350 (produced by BYK Additives & Instruments) were mixed in a predetermined proportion to yield a second ink having the composition presented in Table 2.

Thus, an ink jet ink set composed of a first ink and a second ink was obtained.

Examples 2 to 11

A first ink was prepared in the same manner as in Example 1 except that the materials and the proportions thereof were varied as presented in Table 1. Also, a second ink was prepared in the same manner as in Example 1 except that the materials and the proportions thereof were varied as presented in Table 2. Thus, ink jet ink sets composed of a first ink and a second ink were obtained.

Comparative Examples 1 to 10

A first ink was prepared in the same manner as in Example 1 except that the materials and the proportions thereof were varied as presented in Table 1. Also, a second ink was prepared in the same manner as in Example 1 except that the materials and the proportions thereof were varied as presented in Table 2. Thus, ink jet ink sets composed of a first ink and a second ink were obtained.

For the ink jet ink sets of the Examples and Comparative Examples, Table 1 presents the compositions of the first inks, and Table 2 presents the compositions of the second inks. In the Tables, P.B. 15:4 represents C. I. Pigment Blue 15:4; DEDG, diethylene glycol diethyl ether; MEDG, diethylene glycol methyl ethyl ether; GBL, γ-butyrolactone; BTGH, polyethylene glycol monobutyl ether; FHP, the above-described fluoro-phosphorus compound used as a phosphorus compound; JP513, an alkyl phosphate JP-513 (produced by Johoku Chemical) used as a phosphorus compound; POAA1, a poly(oxyalkylene)amine represented by formula (3) having an X1/X2 in the above described range and a weight average molecular weight of 2000; POAA2, a poly(oxyalkylene)amine represented by formula (4) having a weight average molecular weight of 5000; BYK-333, a surfactant BYK-333 (produced by BYK Additives & Instruments); BYK-3550, a surfactant BYK-3550 (produced by BYK Additives & Instruments; R-40, a surfactant MEGAFAC R-40 (produced by DIC Corporation; 710FL, a surfactant FTERGENT 710FL (produced by Neos); BYK-315N, a surfactant BYK-315N (produced by BYK Additives & Instruments; UVX-35, a surfactant DISPARLON UVX-35 (produced by Kusumoto Chemicals); BYK-350, a surfactant BYK-350 (produced by produced by BYK Additives & Instruments); BYK-325, a surfactant BYK-325 (produced by BYK Additives & Instruments); BYK-333, a surfactant BYK-333 (produced by BYK Additives & Instruments); and B60, a binder PARALOID B60 (produced by Dow Chemical Company). In each of the Examples and Comparative Examples, the size and the shape of the particles of metal powder in the first ink were the same as those of the metal powder in the first ink stock. Also, the viscosities of the first and second inks, measured at 20° C. with a vibration viscometer in accordance with JIS Z 8809, were in the range of 0.5 mPa·s to 15 mPa·s. POAA1 was a block copolymer having an amino group bound to an end of the continuous chain of the oxyethylene units and a methyl group bound to an end of the continuous chain of the oxypropylene units. For the metal powder in the first ink of each Example, randomly selected metal particles were observed. As a result, the average ratio ($S_1/S_0$) of the area $S_1$ μm² when individual ones of the particles were viewed in a direction in which the projected area was largest, that is, when viewed from above, to the area $S_0$ μm² that was the largest of the areas viewed perpendicular to that direction was 19 or more. For the comparison of the surface tensions of the first and second surfactants used in the Examples, 0.1 mass % solutions of each surfactant in diethylene glycol diethyl ether were prepared. The 0.1 mass % solution of the first surfactant in diethylene glycol diethyl ether, which is referred to as the first surfactant solution, and the 0.1 mass % solution of the second surfactant in diethylene glycol diethyl ether, which is referred to as the second surfactant solution were subjected to surface tension measurement. The surface tension of the first surfactant solution was lower than that of the second surfactant solution. For the Comparative Examples, similarly, the surface tensions of the first and second surfactant solutions were measured. However, the surface tensions of the first surfactant solutions were not lower than the surface tension of the corresponding second surfactant solution.

The surface tension was measured with a surface tensiometer DY-300 manufactured by Kyowa Interface Science. The surface tension of each ink was also measured and resented in Table 3.

TABLE 1

| | Content [mass %] | | | | | | | | | | | | | |
|---|---|---|---|---|---|---|---|---|---|---|---|---|---|---|
| | Metal particles | Solvent | | Surface treatment agent | | | | Surfactant | | | | | | Binder |
| | Al particles | DEDG | BTGH | FHP | JP513 | POAA1 | POAA2 | BYK-333 | BYK-3550 | R-40 | 710FL | BYK-315N | UVX-35 | B60 |
| Example 1 | 1.500 | 91.250 | 5.000 | 0.040 | 0.000 | 0.050 | 0.060 | 0.100 | 0.000 | 0.000 | 0.000 | 0.000 | 0.000 | 2.000 |
| Example 2 | 1.500 | 91.250 | 5.000 | 0.000 | 0.000 | 0.150 | 0.000 | 0.100 | 0.000 | 0.000 | 0.000 | 0.000 | 0.000 | 2.000 |
| Example 3 | 1.500 | 91.250 | 5.000 | 0.000 | 0.000 | 0.150 | 0.000 | 0.000 | 0.100 | 0.000 | 0.000 | 0.000 | 0.000 | 2.000 |
| Example 4 | 1.500 | 91.250 | 5.000 | 0.000 | 0.000 | 0.150 | 0.000 | 0.000 | 0.000 | 0.100 | 0.000 | 0.000 | 0.000 | 2.000 |

TABLE 1-continued

| | Content [mass %] | | | | | | | | | | | | |
|---|---|---|---|---|---|---|---|---|---|---|---|---|---|
| | Metal particles | Solvent | | Surface treatment agent | | | | Surfactant | | | | | Binder |
| | Al particles | DEDG | BTGH | FHP | JP513 | POAA1 | POAA2 | BYK-333 | BYK-3550 | R-40 | 710FL | BYK-315N | UVX-35 | B60 |
| Example 5 | 1.500 | 91.250 | 5.000 | 0.000 | 0.000 | 0.000 | 0.150 | 0.000 | 0.000 | 0.100 | 0.000 | 0.000 | 0.000 | 2.000 |
| Example 6 | 1.500 | 91.325 | 5.000 | 0.075 | 0.000 | 0.000 | 0.000 | 0.000 | 0.000 | 0.100 | 0.000 | 0.000 | 0.000 | 2.000 |
| Example 7 | 1.500 | 91.325 | 5.000 | 0.000 | 0.075 | 0.000 | 0.000 | 0.000 | 0.000 | 0.100 | 0.000 | 0.000 | 0.000 | 2.000 |
| Example 8 | 1.500 | 91.175 | 5.000 | 0.075 | 0.000 | 0.150 | 0.000 | 0.000 | 0.000 | 0.100 | 0.000 | 0.000 | 0.000 | 2.000 |
| Example 9 | 1.500 | 91.175 | 5.000 | 0.000 | 0.075 | 0.000 | 0.150 | 0.000 | 0.000 | 0.100 | 0.000 | 0.000 | 0.000 | 2.000 |
| Example 10 | 1.500 | 91.175 | 5.000 | 0.075 | 0.000 | 0.150 | 0.000 | 0.000 | 0.000 | 0.000 | 0.100 | 0.000 | 0.000 | 2.000 |
| Example 11 | 1.500 | 91.175 | 5.000 | 0.075 | 0.000 | 0.150 | 0.000 | 0.100 | 0.000 | 0.000 | 0.000 | 0.000 | 0.000 | 2.000 |
| Comparative Example 1 | 1.500 | 91.250 | 5.000 | 0.000 | 0.000 | 0.150 | 0.000 | 0.000 | 0.000 | 0.000 | 0.000 | 0.100 | 0.000 | 2.000 |
| Comparative Example 2 | 1.500 | 91.250 | 5.000 | 0.000 | 0.000 | 0.000 | 0.150 | 0.000 | 0.000 | 0.000 | 0.000 | 0.100 | 0.000 | 2.000 |
| Comparative Example 3 | 1.500 | 91.325 | 5.000 | 0.075 | 0.000 | 0.000 | 0.000 | 0.000 | 0.000 | 0.000 | 0.000 | 0.100 | 0.000 | 2.000 |
| Comparative Example 4 | 1.500 | 91.325 | 5.000 | 0.000 | 0.075 | 0.000 | 0.000 | 0.000 | 0.000 | 0.000 | 0.000 | 0.100 | 0.000 | 2.000 |
| Comparative Example 5 | 1.500 | 91.175 | 5.000 | 0.075 | 0.000 | 0.150 | 0.000 | 0.000 | 0.000 | 0.000 | 0.000 | 0.100 | 0.000 | 2.000 |
| Comparative Example 6 | 1.500 | 91.175 | 5.000 | 0.000 | 0.075 | 0.000 | 0.150 | 0.000 | 0.000 | 0.000 | 0.000 | 0.100 | 0.000 | 2.000 |
| Comparative Example 7 | 1.500 | 91.175 | 5.000 | 0.000 | 0.075 | 0.000 | 0.150 | 0.000 | 0.000 | 0.000 | 0.000 | 0.100 | 0.000 | 2.000 |
| Comparative Example 8 | 1.500 | 91.175 | 5.000 | 0.000 | 0.075 | 0.000 | 0.150 | 0.000 | 0.000 | 0.000 | 0.000 | 0.000 | 0.100 | 2.000 |
| Comparative Example 9 | 1.500 | 91.175 | 5.000 | 0.000 | 0.075 | 0.000 | 0.150 | 0.000 | 0.000 | 0.000 | 0.000 | 0.000 | 0.100 | 2.000 |
| Comparative Example 10 | 1.500 | 91.400 | 5.000 | 0.000 | 0.000 | 0.000 | 0.000 | 0.000 | 0.000 | 0.000 | 0.100 | 0.000 | 0.000 | 2.000 |

TABLE 2

| | Content [mass %] | | | | | | | | | | |
|---|---|---|---|---|---|---|---|---|---|---|---|
| | Coloring agent | Solvent | | | Surfactant | | | | | | Binder |
| | P.B.15:4 | DEDG | MEDG | GBL | BYK-350 | UVX-35 | BYK-315N | BYK-325 | BYK-333 | R-40 | B60 |
| Example 1 | 6.5 | 73.4 | 5.0 | 10.0 | 0.1 | 0.0 | 0.0 | 0.0 | 0.0 | 0.0 | 5.0 |
| Example 2 | 6.5 | 73.4 | 5.0 | 10.0 | 0.1 | 0.0 | 0.0 | 0.0 | 0.0 | 0.0 | 5.0 |
| Example 3 | 6.5 | 73.4 | 5.0 | 10.0 | 0.0 | 0.1 | 0.0 | 0.0 | 0.0 | 0.0 | 5.0 |
| Example 4 | 6.5 | 73.4 | 5.0 | 10.0 | 0.0 | 0.0 | 0.1 | 0.0 | 0.0 | 0.0 | 5.0 |
| Example 5 | 6.5 | 73.4 | 5.0 | 10.0 | 0.0 | 0.0 | 0.1 | 0.0 | 0.0 | 0.0 | 5.0 |
| Example 6 | 6.5 | 73.4 | 5.0 | 10.0 | 0.0 | 0.0 | 0.1 | 0.0 | 0.0 | 0.0 | 5.0 |
| Example 7 | 6.5 | 73.4 | 5.0 | 10.0 | 0.0 | 0.0 | 0.1 | 0.0 | 0.0 | 0.0 | 5.0 |
| Example 8 | 6.5 | 73.4 | 5.0 | 10.0 | 0.0 | 0.0 | 0.1 | 0.0 | 0.0 | 0.0 | 5.0 |
| Example 9 | 6.5 | 73.4 | 5.0 | 10.0 | 0.0 | 0.0 | 0.1 | 0.0 | 0.0 | 0.0 | 5.0 |
| Example 10 | 6.5 | 73.4 | 5.0 | 10.0 | 0.0 | 0.0 | 0.0 | 0.1 | 0.0 | 0.0 | 5.0 |
| Example 11 | 6.5 | 28.9 | 49.5 | 10.0 | 0.1 | 0.0 | 0.0 | 0.0 | 0.0 | 0.0 | 5.0 |
| Comparative Example 1 | 6.5 | 78.9 | 5.0 | 10.0 | 0.0 | 0.0 | 0.1 | 0.0 | 0.0 | 0.0 | 5.0 |
| Comparative Example 2 | 6.5 | 78.9 | 5.0 | 10.0 | 0.0 | 0.0 | 0.1 | 0.0 | 0.0 | 0.0 | 5.0 |
| Comparative Example 3 | 6.5 | 78.9 | 5.0 | 10.0 | 0.0 | 0.0 | 0.1 | 0.0 | 0.0 | 0.0 | 5.0 |
| Comparative Example 4 | 6.5 | 78.9 | 5.0 | 10.0 | 0.0 | 0.0 | 0.1 | 0.0 | 0.0 | 0.0 | 5.0 |
| Comparative Example 5 | 6.5 | 78.9 | 5.0 | 10.0 | 0.0 | 0.0 | 0.1 | 0.0 | 0.0 | 0.0 | 5.0 |
| Comparative Example 6 | 6.5 | 78.9 | 5.0 | 10.0 | 0.0 | 0.0 | 0.1 | 0.0 | 0.0 | 0.0 | 5.0 |
| Comparative Example 7 | 6.5 | 78.9 | 5.0 | 10.0 | 0.1 | 0.0 | 0.0 | 0.0 | 0.0 | 0.0 | 5.0 |
| Comparative Example 8 | 6.5 | 78.9 | 5.0 | 10.0 | 0.1 | 0.0 | 0.0 | 0.0 | 0.0 | 0.0 | 5.0 |
| Comparative Example 9 | 6.5 | 78.9 | 5.0 | 10.0 | 0.0 | 0.0 | 0.0 | 0.0 | 0.0 | 0.1 | 5.0 |

TABLE 2-continued

| | Content [mass %] | | | | | | | | | | |
|---|---|---|---|---|---|---|---|---|---|---|---|
| | Coloring agent | Solvent | | | Surfactant | | | | | | Binder |
| | | | | | BYK- | UVX- | BYK- | BYK- | BYK- | R- | |
| | P.B.15:4 | DEDG | MEDG | GBL | 350 | 35 | 315N | 325 | 333 | 40 | B60 |
| Comparative Example 10 | 6.5 | 78.9 | 5.0 | 10.0 | 0.1 | 0.0 | 0.0 | 0.0 | 0.0 | 0.0 | 5.0 |

5. Evaluation 5-1. Color Metallic Luster

Printed items were produced with each of the ink jet sets of the Examples and Comparative Examples, as described below.

First, a vinyl chloride ink jet printing medium was prepared. Then, the first and second inks were introduced into an ink jet apparatus and ejected from the apparatus to form a pattern in the manner described below. When the first and second inks were ejected, the atmosphere and the printing medium were at 40° C.

The printing medium was imaginarily divided into a hundred 3 cm×3 cm regions arranged in a 10×10 array.

The first ink was applied onto the 10 regions in the first row by an ink jet method at a print duty of 10% and, then, onto the regions in the second to tenth rows while the amount of the first ink applied to each row was increased by 10% so as to reach 100% for the 10 regions in the tenth row. The amount of ink applied at a print duty of 100% was 8 mg/inch$^2$.

Subsequently, the second ink was applied onto the regions that had received the first ink in the manner described below. The second ink was applied onto the 10 regions in the first column by an ink jet method at a print duty of 10% and, then, onto the regions from the second to tenth columns while the amount of the second ink applied to each column was increased by 10% so as to reach 100% for the 10 regions in the tenth column.

The gloss of the 100 regions of the resulting printed item in each Example or Comparative Example was measured at a tilt angle of 60° with a glossmeter MINOLTA MULTI GLOSS 268.

The gloss of the individual regions of the printed items was compared to the gloss of the corresponding region of the printed item of Comparative Example 1 used as a reference. That is, the glosses of the two printed items were compared between the regions to which the first and second inks were applied at the same print duty. The number of regions having a gloss of 20 or more higher than the corresponding region of Comparative Example 1 was evaluated according to the following criteria. The larger the number of the regions having a higher gloss, the better the gloss of the metallic color printed layer. C or higher rating is considered to be good.

A: 20 or more of the 100 regions had a gloss of 20 or more higher than the reference.

B: 10 to 19 of the 100 regions had a gloss of 20 or more higher than the reference.

C: 5 to 9 of the 100 regions had a gloss of 20 or more higher than the reference.

D: 1 to 4 of the 100 regions had a gloss of 20 or more higher than the reference.

E: None of the 100 regions had a gloss of 20 or more higher than the reference.

5-2. Evaluation of First Ink Alone

The first ink of each Example or Comparative Example was applied at a duty of 100% in the same manner as described in (5-1), but the second ink was not used. The resulting printed item was visually observed and evaluated according to the following criteria:

A: The metallic luster of the printed item was excellent.

B: The metallic luster was good but inferior to A.

C: The metallic luster was acceptable but insufficient.

D: The metallic luster was poor.

These results in each Example and Comparative Example are presented in Table 3 with the surface tensions of the first and second inks and the difference in surface tension of the second ink from the first ink.

TABLE 3

| | First ink surface tension [mN/m] | Second ink surface tension [mN/m] | Difference in surface tension of second ink from first ink [mN/m] | Color metallic luster | Evaluation of first ink alone |
|---|---|---|---|---|---|
| Example 1 | 25 | 27 | 2 | C | A |
| Example 2 | 25 | 27 | 2 | C | C |
| Example 3 | 25 | 27 | 2 | C | C |
| Example 4 | 22 | 27 | 5 | A | C |
| Example 5 | 22 | 27 | 5 | A | B |
| Example 6 | 22 | 27 | 5 | A | B |
| Example 7 | 22 | 27 | 5 | A | B |
| Example 8 | 22 | 27 | 5 | A | A |
| Example 9 | 22 | 27 | 5 | A | A |
| Example 10 | 22 | 27 | 5 | A | A |
| Example 11 | 25 | 28 | 3 | B | A |
| Comparative Example 1 | 27 | 27 | 0 | E | C |
| Comparative Example 2 | 27 | 27 | 0 | E | C |

TABLE 3-continued

|  | First ink surface tension [mN/m] | Second ink surface tension [mN/m] | Difference in surface tension of second ink from first ink [mN/m] | Color metallic luster | Evaluation of first ink alone |
|---|---|---|---|---|---|
| Comparative Example 3 | 27 | 27 | 0 | E | B |
| Comparative Example 4 | 27 | 27 | 0 | E | B |
| Comparative Example 5 | 27 | 27 | 0 | E | A |
| Comparative Example 6 | 27 | 27 | 0 | E | A |
| Comparative Example 7 | 27 | 27 | 0 | E | A |
| Comparative Example 8 | 27 | 27 | 0 | E | A |
| Comparative Example 9 | 27 | 22 | −5 | E | A |
| Comparative Example 10 | 27 | 27 | 0 | E | D |

Table 3 suggests that the printed items produced according to the present discloser can exhibit satisfactory color metallic luster. In contrast, the printed items of the Comparative Examples did not provide good results. Although the metallic luster of the printed layer formed of the first ink alone was satisfactory even in the Comparative Examples, the formation of color metallic images requires the ink set or the printing method of the present disclosure.

What is claimed is:

1. An ink jet ink set including a plurality of inks to be ejected by an ink jet method, the ink jet ink set comprising:
a first ink containing metal particles; and
a second ink containing a coloring agent selected from materials other than metal, the second ink having a higher surface tension than the first ink,
wherein the first ink contains a first surfactant, and the second ink contains a second surfactant different from the first surfactant, and
wherein the first surfactant solution that has a 0.1 mass % solution of the first surfactant in diethylene glycol diethyl ether has a lower surface tension than a second surfactant solution that is a 0.1 mass % solution of the second surfactant in diethylene glycol diethyl ether.

2. The ink jet ink set according to claim 1, wherein
the first ink contains a surface treatment agent that modifies the surfaces of the metal particles, the surface treatment agent being at least one selected from the group consisting of phosphorus compounds and poly(oxyalkylene)amines.

3. The ink jet ink set according to claim 1, wherein
the difference in surface tension between the second ink and the first ink is 0.5 mN/m or more.

4. The ink jet ink set according to claim 1, wherein
both of the first and second inks are nonaqueous ink.

5. The ink jet ink set according to claim 1, wherein
the metal particles individually have a shape like a fish scale.

6. A printing method comprising:
a first application step of ejecting a first ink by an ink jet method to apply the first ink onto a printing medium, the first ink containing metal particles; and
a second application step of ejecting a second ink by an ink jet method to apply the second ink onto the printing medium having the first ink applied thereto, the second ink containing a coloring agent selected from materials other than metal, the second ink having a higher surface tension than the first ink,
wherein the first ink contains a first surfactant, and the second ink contains a second surfactant different from the first surfactant, and
wherein the first surfactant solution that has a 0.1 mass % solution of the first surfactant in diethylene glycol diethyl ether has a lower surface tension than a second surfactant solution that is a 0.1 mass % solution of the second surfactant in diethylene glycol diethyl ether.

7. The printing method according to claim 6, wherein
the first ink contains a surface treatment agent that modifies the surfaces of the metal particles, the surface treatment agent being at least one selected from the group consisting of phosphorus compounds and poly(oxyalkylene)amines.

8. The printing method according to claim 6, wherein
the difference in surface tension of the second ink from the first ink is 0.5 mN/m or more.

9. The printing method according to claim 6, wherein
both of the first and second inks are nonaqueous ink.

10. The printing method according to claim 6, wherein
the metal particles individually have a shape like a fish scale.

* * * * *